Patented Apr. 4, 1950

2,503,209

UNITED STATES PATENT OFFICE 2,503,209

UNSATURATED ALKYD REACTED WITH UNSATURATED ISOCYANATE

Arthur S. Nyquist, Cos Cob, and Edward L. Kropa, Old Greenwich, Conn., assignors to American Cyanamid Company, New York, N. Y., a corporation of Maine No Drawing. Application January 30, 1948, Serial No. 5,508

17 Claims. (Cl. 260—45.4)

This invention relates broadly to new and useful synthetic compositions and to methods of preparing the same. More particularly the invention is concerned with the production of polymerizable and polymerized compositions comprising an unsaturated alkyd resin modified with a particular kind of an isocyanate. Specifically the invention is concerned with polymerizable compositions comprising a polymerizable product of reaction of ingredients comprising (1) an organic solvent-soluble (e. g., benzene-soluble) unsaturated alkyd resin and (2) from 3 to 25% (more particularly from 5 to 20%), by weight of the alkyd resin of (1), of a primary isocyanate represented by the general formula

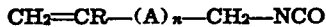

$$CH_2=CR-(A)_n-CH_2-NCO$$

where R represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value of the grouping consisting of 0 and 1, the methylene radical attached to the isocyanate grouping being attached directly, when $n$ is 1, to any carbon atom of the divalent radical represented by A; with products comprising such compositions which have been polymerized either alone or admixed with other monomeric materials which are copolymerizable therewith; and with methods of preparing such polymerizable and polymerized compositions.

Illustrative examples of divalent radicals that A in the aforementioned general formula for the primary isocyanate may represent are: ethylene, propylene (trimethylene), butylene, isobutylene, pentylene, isopentylene, hexylene and other divalent saturated aliphatic hydrocarbon radicals, including divalent saturated cycloaliphatic hydrocarbon radicals, e. g., cyclopentylene, cyclohexylene, cycloheptylene, etc.; phenylene, naphthylene, biphenylene and other divalent aromatic hydrocarbon radicals; 2,4-tolylene, xylylene, ethyl 2,5-phenylene, propyl 2,4-phenylene, isopropyl 3,4-phenylene, 1-butyl 2,4-naphthylene and other divalent saturated aliphatic-substituted aromatic hydrocarbon radicals; phenylethylene, phenylpropylene, phenylbutylene, naphthylethylene, naphthylisobutylene and other divalent aromatic-substituted saturated aliphatic hydrocarbon radicals; as well as radicals that may be classed either as divalent saturated aliphatic-substituted aromatic or divalent aromatic-substituted saturated aliphatic hydrocarbon radicals, e. g., 4,alpha-tolylene, 3,beta-phenyleneethyl, 4,alpha-xylylene, 2,gamma-phenylene-butyl, etc.

It is an object of the present invention to produce new polymerizable and polymerized compositions. Another object of the invention is to provide modified unsaturated alkyd resins and copolymers thereof, which products in their substantially fully cured or polymerized state have better resistance to water than products made from unsaturated alkyd resins which have not been modified with an isocyanate of the kind described in the first paragraph of this specification. Another object of the invention is to prepare new and improved synthetic materials which are particularly suitable for use as casting, molding, coating, adhesive and laminating compositions or as components of such compositions. Another object of the invention is to provide organic solvent-soluble, polymerizable, modified unsaturated alkyd resins in which unesterified carboxyl and hydroxyl groups of the resin as initially prepared have been caused to react with the —NCO grouping of an isocyanate which also contains a polymerizably reactive unsaturated hydrocarbon radical, so that the modified alkyd resin can undergo polymerization and copolymerization reactions not only through the alpha,beta-enal (i. e.,

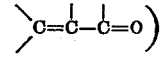

$$\diagdown C=C-C=O \diagup )$$

groups present therein but also through the polymerizably reactive unsaturated hydrocarbon radicals derived from the isocyanate. Another object of the invention is to provide methods for making new polymerizable and polymerized compositions. Other objects of the invention will be apparent to those skilled in the art from the description which follows.

It was suggested prior to our invention that copolymers of a 1-alkenyl isocyanate, e. g., vinyl isocyanate, with a vinyl or a vinylidene compound, specifically styrene, vinyl acetate and methyl methacrylate, might be prepared, and that the incorporation of the isocyanate group permits further modification of the product with monomeric or polymeric compounds containing one or more reactive hydrogen atoms, among which compounds alkyd resins specifically have been mentioned. It also was suggested prior to our invention that organic solvent-soluble alkyd resins be treated with a polyisocyanate or a polyisothiocyanate, that is, a compound containing a plurality of —NCO or of —NCS groups.

In our copending application Serial No. 694,156, filed August 30, 1946, we have disclosed and claimed compositions comprising copolymers of a primary isocyanate of the kind described in the first paragraph of this specification and a different organic compound which is copolymerizable with the isocyanate, which contains a single $CH_2=C<$ grouping, and which is free from a hydrogen atom reactive with the isocyanate grouping. We also disclosed in the aforementioned application that the copolymers of that invention may be modified by the addition of other reactive or non-reactive materials or that they themselves may be used as modifiers of other substances which are reactive or non-reactive with the copolymer, and mentioned alkyd resins containing —OH groups among numerous illustrative examples of materials with which the reactive isocyanate copolymers may be combined.

The present invention is directed specifically to organic solvent-soluble (e. g., benzene-soluble), polymerizable, modified unsaturated alkyd resins obtained by incorporating, specifically by chemical combination, with an organic solvent-soluble unsaturated alkyd resin a small amount of the order of 3 to 25% (preferably from 5 to 20 or 25%), by weight of the alkyd resin, of allyl isocyanate or other primary isocyanate of the kind described briefly in the first paragraph of this specification; and to the products obtained by polymerizing such resins both alone and admixed with other monomers or partial polymers which are copolymerizable therewith, e. g., styrene, or other vinyl-substituted aromatic hydrocarbon, ethyl acrylate or other alkyl acrylate, diallyl phthalate or other polyallyl ester, etc. It was found that the unsaturated isocyanates used in practicing our invention could be chemically combined with an organic solvent-soluble (e. g., benzene-, toluene-, xylene-, etc., soluble) unsaturated alkyd resin without gelation of the resin during the reaction and without rendering the isocyanate-modified alkyd resin insoluble in organic solvents. This was quite surprising and unexpected since ordinarily it would be expected that any attempt to interact an unsaturated isocyanate of the kind with which this invention is concerned with such a soluble, unsaturated alkyd resin, and which contains free carboxyl or hydroxyl groups or both, would result in premature gelation or insolubilization of the resin as a result of copolymerization through the unsaturated hydrocarbon groups of the isocyanate or reaction of the —NCO group with hydrogen atoms in the alkyd resin, or by both such means. It also would be expected that the reaction between the isocyanate groupings and the unsaturated alkyd resin would be such that the product would have little or no solubility in organic solvents of the reactive or non-reactive types, and would be incapable of copolymerizing with styrene, diallyl phthalate, vinyl actate and other monomeric materials. Contrary to expectations it was surprisingly found that the unsaturated isocyanates used in practicing our invention can be chemically combined with organic solvent-soluble unsaturated alkyd resins containing reactive hydrogen atoms and still obtain a product which is soluble in organic solvents of the reactive and non-reactive or inert types. For example, the isocyanate-modified unsaturated alkyd resin may be dissolved in styrene, diallyl phthalate or other reactive solvent, and the resulting mixture then may be used in coating, casting, adhesive, laminating and other compositions, which preferably also contain a suitable polymerization catalyst. Or, coating and other compositions may be produced by dissolving the isocyanate-modified alkyl resin in benzene, xylene, toluene or other inert solvent, either alone or with other conventional components of a composition of the kind being produced. After converting the composition to a hardened state, as by heating, a product is obtained which is characterized by its superior water and chemical resistance, combined with resistance to marring, chalking and organic solvents, as well as toughness, good film flexibility and ability to adhere tenaciously in film form to surfaces to which it is applied.

We are not able to state definitely the reasons why the reactive groups in the isocyanates used in practicing our invention seem to be preferential in the reaction with an organic solvent-soluble unsaturated alkyd resin. Since the isocyanates employed contain an isocyanate (—NCO) grouping attached to a primary carbon atom, this fact offers one logical explanation for the unusual results obtained since, as was pointed out in our aforementioned copending application, isocyanate groupings in this position are much more chemically reactive with hydrogen-donor materials, e. g., unsaturated alkyd resins having an acid number of from 10 to 80 or more, than isocyanates in which the isocyanate grouping is located elsewhere in the molecule. Hence it is probable that the isocyanate grouping reacts more quickly with the reactive hydrogen in the unsaturated alkyd resin than the isocyanate can copolymerize through its unsaturated hydrocarbon groupings with the unsaturated groupings in the alkyd resin.

The present invention makes possible the conversion of highly hydrophilic groups of unsaturated alkyd resins to polar groups which are much less hydrophilic and still obtain an organic solvent-soluble unsaturated alkyd resin. Since the isocyanate can be reacted with the unsaturated alkyd resin at a low temperature, the polar groups initially present therein can be altered without gelation of the resin and still have polymerizable groups present in the resin molecule. If effort be made to change the highly hydrophilic polar groups by esterification, higher temperatures are required and there is a tendency for the resin to gel before the esterification can be completed.

From the foregoing it will be seen that our invention provides a ready and economical means of altering the highly hydrophilic polar groups of an unsaturated alkyd resin whereby a new and improved resin is obtained. In order to attain the advantages of the invention the isocyanate should be used in an amount corresponding to at least about 3%, preferably 5%, by weight of the alkyd resin. However, the isocyanate should not be used in an amount exceeding about 25% by weight of the alkyd resin since otherwise the excess of isocyanate over that required for reaction between the —NCO groups of the isocyanate and the active hydrogen atoms in the alkyd resin will tend to copolymerize with the alkyd resin through the polymerizably reactive hydrocarbon radicals of the isocyanate and the alpha, beta-enal groups of the alkyd resin, thus making it more difficult to obtain a polymerizable, organic solvent-soluble, isocyanate-modified unsaturated alkyd resin due to the greater tendency of the reaction product of the isocyanate and alkyd resin to gel or become insoluble when the isocyanate constitutes substantially above 25% (e. g., 30 or 40% or more) by weight of the alkyd resin.

The isocyanates used in practicing our invention may be prepared, for example, by three general methods: the first involves the reaction of the corresponding alkenyl halide with a metallic isocyanate; the second involves the metathesis of the corresponding alkenyl urea and an isocyanate, which latter may be mono- or polyfunctional; while the third involves the reaction of the corresponding amine with phosgene and the dehydrohalogenation of the corresponding acid chloride thereby obtained.

Since all of the amines used in the preparation of these isocyanates are attached to a primary carbon atom they may be produced by the catalytic reduction of a suitable derivative of the corresponding nitrile. Inasmuch as the reduction of the nitrile to the amine would destroy the final unsaturation, it is necessary to protect this grouping during the reduction. This may be done, for example, by the reduction of the corresponding carbinol derivative of the nitrile and subsequent dehydration and reaction with phosgene. The resulting acid chloride is then dehydrohalogenated to yield the isocyanate.

Illustrative examples of primary isocyanates that may be used in practicing the present invention and which are embraced by the general formula $CH_2=CR-(A)_x-CH_2-NCO$, where R, A and $n$ have the meanings hereinbefore given, are listed below:

Allyl isocyanate
Methallyl isocyanate
3-butenyl isocyanate
3-methyl-3-butenyl isocyanate
4-pentenyl isocyanates
4-methyl-4-pentenyl isocyanates
5-hexenyl isocyanates
5-methyl-5-hexenyl isocyanates
10-hendecenyl isocyanates
Vinylbenzyl isocyanates
Isopropenylbenzyl isocyanates
Vinylnaphthylmethyl isocyanates
Isopropenylnaphthylmethyl isocyanates
Vinylbiphenylylmethyl isocyanates
Isopropenylbiphenylylmethyl isocyanates
2-methyl-3-butenyl isocyanate
2,3-dimethyl-3-butenyl isocyanate
2-phenyl-3-butenyl isocyanate
2-phenyl-3-methyl-3-butenyl isocyanate
2-tolyl-3-butenyl isocyanate
2-tolyl-3-methyl-3-butenyl isocyanate
2-methyl-4-pentenyl isocyanate
2-ethyl-4-methyl-4-pentenyl isocyanate
2-phenyl-4-pentenyl isocyanate
2-tolyl-4-methyl-4-pentenyl isocyanate
Allylbenzyl isocyanates
Methallylbenzyl isocyanates
2-benzyl-3-butenyl isocyanate
2-benzyl-4-pentenyl isocyanate
2-benzyl-4-methyl-4-pentenyl isocyanate
Vinylcyclopentylmethyl isocyanates
Isopropenylcyclohexylmethyl isocyanates
2,2-dimethyl-3-butenyl isocyanate The formulas for the above-named compounds are given in our copending application Serial No. 694,156.

The organic solvent-soluble unsaturated alkyd resins used in practicing our invention are prepared in accordance with technique now well known to those skilled in the resin art. Such resins are products of reaction of ingredients comprising a polyhydric alcohol and an unsaturated polycarboxylic acid and are preferably produced by the esterification of an unsaturated alpha,beta-organic acid of the aliphatic series, more particularly an unsaturated alpha,beta-polycarboxylic acid, with a polyhydric alcohol, for instance a glycol (e. g., diethylene glycol), glycerol, etc. Although esterification of the acid with a polyhydric alcohol is perhaps one of the simplest, most convenient ways of obtaining an unsaturated alkyd resin, we are not precluded from using resins otherwise derived from unsaturated alpha,beta-organic acids, more specifically unsaturated alpha,beta - polycarboxylic acids. We also may employ a crystalline unsaturated alkyd resin obtained by the reaction of a glycol, which is completely symmetrical, with an alpha,beta-unsaturated dicarboxylic acid having a transfiguration such as fumaric acid. Methods for the preparation of crystalline unsaturated alkyd resins are disclosed and claimed in the copending application of Edward L. Kropa, Serial No. 564,723, filed November 22, 1944. The unsaturated alkyd resins used in practicing the present invention contain a plurality of polymerizably reactive alpha,beta-enal groups,

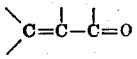

Mixtures of unsaturated alkyd resins may be employed if desired.

Any unsaturated alpha,beta-organic acid of the aliphatic series and more specifically any alpha,beta-unsaturated polycarboxylic (e. g., dicarboxylic) acid may be used in preparing the unsaturated alkyd resin. Examples of unsaturated alpha,beta-organic acids that may be employed are: maleic, fumaric, itaconic, citraconic, monohalomaleic (e. g., monochloromaleic), monohalofumaric (e. g., monochlorofumaric), mesaconic, aconitic, acetylene dicarboxylic, etc. Anhydrides of these acids may be used when available. The unsaturated polycarboxylic (e. g., dicarboxylic, tricarboxylic, etc.) acid may be replaced in part with an unsaturated monocarboxylic acid, e. g., acrylic, methacrylic, betabenzoyl acrylic, cinnamic, crotonic, etc. Mixtures of unsaturated polycarboxylic acids or mixtures thereof with one or more unsaturated monocarboxylic acids may be used if desired. When using polycarboxylic acids higher than dicarboxylic acid, care should be taken to avoid gelation of the resin during its preparation, for instance by using suitable proportions of such higher polycarboxylic acids with mono- and/or dicarboxylic acids.

Any polyhydric alcohol may be employed, but we prefer to use a glycol. Examples of polyhydric alcohols that may be used in making the unsaturated alkyd resin are ethylene glycol, di-, tri- and tetraethylene glycol, hexaethylene glycol, propylene glycol, pentamethylene glycol, decamethylene glycol, glycerol, pentaerythritol, etc. Mixtures of polyhydric alcohols may be employed if desired.

In some cases, instead of using a polymerizable, organic solvent-soluble, unmodified, unsaturated alkyd resin or one which has been modified with an unsaturated monocarboxylic acid as above described as a starting material, we may use a polymerizable, organic solvent-soluble, unsaturated alkyd resin which has been internally modified by replacing a part, say up to about 75 mol per cent, of the unsaturated polycarboxylic acid with a non-ethylenic polycarboxylic acid, for instance a saturated aliphatic polycarboxylic acid, e. g., succinic, adipic, glutaric, pimelic, sebacic, azelaic, suberic, tricarballylic, citric, etc., a cyclic polycarboxylic acid, more particularly a saturated cycloaliphatic polycarboxylic acid such as the cyclopentane dicarboxylic acids, the cyclohexane dicarboxylic acids, the alkyl cycloalkane polycarboxylic acids, etc., or an aromatic polycarboxylic acid, e. g., phthalic, benzoyl phthalic, terephthalic, benzophenone - 2,4' - dicarboxylic, chlorinated phthalic acid or anhydride (e. g., tetrachlorophthalic acid or anhydride), etc.

Various mono-esterifiable compounds also may be incorporated into the starting, unmodified, unsaturated alkyd resin or into such a resin which has been modified as above described. Thus, we may employ an unsaturated alkyd resin which has been modified by incorporating therein a saturated or unsaturated, normal or isomeric monohydric alcohol, or mixtures thereof, a saturated or unsaturated monocarboxylic acid, or mixtures thereof, or both such mono-esterifiable monohydroxy organic compounds. Examples of monohydric alcohols that may be used as modifiers of the alkyd resin starting reactant are propyl, isopropyl, butyl, isobutyl, amyl, isoamyl, hexyl, octyl, decyl, dodecyl to octadecyl, inclusive, allyl, methallyl, 1-chloroallyl, 2-chloroallyl, crotyl and cinnamyl alcohols, 3-hydroxy-1-butene, etc. The use of methyl and ethyl alcohols is not precluded, but in general these alcohols are less suitable because of their lower boiling points. As monobasic acids may be used, for example, saturated or unsaturated, normal or isomeric acids containing only one esterifiable group, e. g., acetic, propionic to stearic, inclusive, benzoic, etc., acids of drying, semi-drying and drying oils, e. g., the acids of tung oil, linseed oil, rapeseed oil, soya bean oil, castor oil, etc. The monoesterifiable compound may be introduced into the esterification product before, during or after the esterification of the polyhydric alcohol with the unsaturated polybasic acid under conditions such that inter-esterification of the monoesterifiable compound with the incompletely esterified polyhydric alcohol-polybasic acid reaction product is obtained.

The unsaturated alkyd resins which have been modified with an isocyanate in accordance with our invention are soluble in organic solvents, that is, they are soluble in some organic solvent but not necessarily in all organic solvents, and this same meaning is intended when the expression "organic solvent-soluble" is employed with reference to the starting unsaturated alkyd resin, which latter contains hydrogen atoms which are reactive with an isocyanate grouping. For instance, the isocyanate grouping can react with the hydrogen of —OH or —COOH groups present in the alkyd resin.

We prefer to use organic solvent-soluble, unsaturated alkyd resins having a relatively low acid number, for example an acid number of 10 to 40, although resins having an acid number of 70 or 80, or even higher, may be used. Generally the acid number should be as low as possible, but this is sometimes influenced by practical considerations such as time, temperature and economy. If difficulty be encountered in producing an unsaturated alkyd resin of the desired low acid number from the polyhydric alcohol and unsaturated polycarboxylic acid reactants alone, a monohydric alcohol may be employed as a third reactant thereby to obtain a product of lower acid number.

The terms "acid" and more specifically "polycarboxylic acid" "dicarboxylic acid" as used herein and in certain of the appended claims includes within its meanings the anhydride thereof if available.

More specific examples of unsaturated alkyd resins that may be used are those resulting from reaction of the following ingredients in the parts specified:

Ethylene glycol (18 parts) and maleic anhydride (27.4 parts)

Glycerine (18.4 parts) and maleic anhydride (29.4 parts)

Diethylene glycol (30.3 parts) maleic anhydride (13.2 parts) and phthalic anhydride (21.7 parts)

Diethylene glycol (106 parts) and itaconic acid (130 parts)

Ethylene glycol (20 parts), maleic anhydride (29.4 parts) and succinic acid (3.3 parts)

Ethylene glycol (62.05 parts), itaconic acid (32.51 parts) and phthalic anhydride (111.03 parts)

Diethylene glycol (31.8 parts), maleic anhydride (27.9 parts) and tung oil acids (7.6 parts)

Ethylene glycol (12 parts), maleic anhydride (11.76 parts), linseed oil acids (10.1 parts) and phthalic anhydride (8.9 parts)

Diethylene glycol (160 parts) and maleic anhydride (147 parts)

Ethylene glycol (17.4 parts), maleic anhydride (28.8 parts) and stearic acid (3.4 parts)

Diethylene glycol (30.6 parts), maleic anhydride (27.93 parts) and decyl alcohol (4.7 parts)

Ethylene glycol (35.4 parts), maleic anhydride (29.4 parts), octyl alcohol (13 parts) and acetic anhydride (11.8 parts)

Diethylene glycol (106 parts), fumaric acid (116 parts), tetrahydroabietyl alcohol (73 parts) and linseed oil fatty acids (70 parts)

Alpha-propylene glycol (1023 parts) and maleic anhydride (1200 parts)

Diethylene glycol (530 parts), fumaric acid (638 parts) and benzyl alcohol (162 parts)

Diethylene glycol (530 parts), fumaric acid (638 parts) and tetrahydroabietyl alcohol (292 parts)

Ethylene glycol (310 parts), fumaric acid (580 parts) and omega-hydroxydecanoic acid (188 parts)

Fumaric acid (170 parts), diethylene glycol (132.5 parts) and linseed oil fatty acid monoglycerides (89 parts)

Reference is made to Patent No. 2,409,633, issued October 22, 1946, and to various copending applications of Edward L. Kropa for more detailed information regarding the ingredients and the preparation of unsaturated alkyd resins which may be modified with an isocyanate of the kind and in the manner herein described and for additional examples thereof, for instance his copending applications Serial No. 540,142, filed June 13, 1944, now Patent No. 2,443,740; Serial No. 555,194, filed September 21, 1944, now Patent No. 2,443,741; Serial No. 564,723, filed November 22, 1944; Serial No. 616,648, filed September 15, 1945; Serial No. 653,959, filed March 12, 1946, now Patent No. 2,485,294, patented October 18, 1949, and Serial No. 700,833, filed October 2, 1946.

The polymerizable, resinous compositions of this invention are prepared by treating an organic solvent-soluble unsaturated alkyd resin, numerous examples of which have been given hereinbefore, with at least about 3%, preferably 5%, and not more than about 25%, by weight of the alkyd resin, of a primary unsaturated hydrocarbon mono-isocyanate of the kind described above. During this treatment reaction takes place between the reactants through the active hydrogen atoms present in the alkyd resin and the —NCO grouping of the isocyanate, leaving unsaturated hydrocarbon groupings of the isocyanate available for interpolymerization or for copolymerization with polymerizably reactive groupings in other monomers with which the isocyanate-modified alkyd resin may be admixed. For reasons hereinbefore mentioned, it is important that the amount of isocyanate employed should not exceed about 25% by weight of the alkyd resin.

The reaction between the isocyanate and the unsaturated alkyd resin may be effected in the presence or absence of an inert solvent. Thus the reaction may be effected while the mixed reactants are dissolved in an organic solvent which is inert during the reaction. Examples of such solvents are benzene, toluene, xylene, dioxane, ethers (e. g., dibutyl ether), esters (e. g., butyl acetate), ketones (e. g., methyl ethyl ketone), chlorobenzene, ethylene dichloride, etc. If desired, the isocyanate may be added in small increments to the alkyd resin or, if a solvent be used, to the solution of the alkyd resin in order better to control the reaction. The temperature of the reaction may be varied as desired or as conditions may require. The reaction proceeds to completion more slowly at room temperatures. When a solvent is used, the reaction may be effected under reflux at temperatures up to the boiling temperature of the solution.

The time of the reaction may be considerably varied, but in no case is the reaction allowed to proceed to the point where the reaction product becomes insoluble or substantially insoluble in an organic solvent. With unsaturated alkyd resins having a high acid number or containing a large proportion of unesterified hydroxyl groups, reaction periods of the order of 2 or 3 minutes are satisfactory, especially when using the higher proportions (e. g., 20 to 25% by weight of the alkyd resin) of isocyanate. Depending, for example, upon the particular reactants employed, the size of the batch and the particular properties desired in the finished product, the time of reaction generally is of the order of from ¼ to 5 or 6 hours.

If the reaction between the unsaturated alkyd resin and the isocyanate be effected in the absence of a solvent, the organic solvent-soluble reaction product thereby produced may then be polymerized alone or in the presence of other copolymerizable monomers or partial polymers as hereafter more fully described. If the reaction between the primary reactants be effected in the presence of a solvent, then the solvent usually is removed, as by distillation, before further use of the reaction product. In some cases, however, it may be economically advantageous to use the solvent solution of the isocyanate-modified unsaturated alkyd resin in making solvent-containing coating, laminating and other compositions. Or, one or more other monomeric materials which are copolymerizable with the aforementioned resin, and which are soluble in the organic solvent employed, may be added to the resin solution, together with a suitable polymerization catalyst, and copolymerization between the resin and the added monomer or monomers may be effected in solution state, after which the solvent is removed.

The monomeric material which is copolymerized with the isocyanate-modified unsaturated alkyd resin (or mixture of such resins) is preferably one which contains a $CH_2=C<$ grouping, has a boiling point of at least about 60° C. and no conjugated carbon bonds. Allyl compounds, that is, compounds containing one or more $CH_2=CH-CH_2-$ groupings, more particularly those which boil above 60° C., are especially suitable for use. Examples of monomeric materials which may be copolymerized with the isocyanate-modified, unsaturated alkyd resin, more particularly an organic solvent-soluble, isocyanate-modified alkyd resin obtained by reaction of ingredients comprising a polyhydric alcohol and an ethylenically unsaturated alpha, beta-polycarboxylic acid of the aliphatic series, are the unsaturated alcohol esters, e. g., the allyl, methallyl, crotyl, 1-chloroallyl, 2-chloroallyl, cinnamyl, vinyl, methvinyl, alpha-phenylallyl, propargyl, etc., esters of saturated and unsaturated, aliphatic and aromatic, monobasic and polybasic acids, such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, toluic, phenylacetic, phthalic, terephthalic, benzoylphthalic, etc.; the saturated monohydric alcohol esters, e. g., the methyl, ethyl, propyl, butyl, isobutyl, etc., esters of the unsaturated aliphatic monobasic and polybasic acids, illustrative examples of which appear above; vinyl cyclic compounds, e. g., styrene, chlorostyrenes, dichlorostyrenes, methyl styrenes, dimethyl styrenes, α,p-dimethyl styrene, the various cyano styrenes, vinyl naphthalene, vinyl cyclohexane, vinyl furane, vinyldibenzofuran, divinyl benzene, vinyl and divinyl pyridines, vinyl and divinyl thiophenes, etc.; unsaturated ethers, e. g., ethyl vinyl ether, diallyl ether, methallyl ethyl ether, dimethallyl ether, etc.; unsaturated ketones, e. g., methyl vinyl ketone, divinyl ketone, methyl allyl ketone, etc.; methylene malonic esters, e. g., methylene methyl malonate, etc.

The vinyl compounds, including the vinyl esters and the vinyl-substituted cyclic, acyclic and heterocyclic compounds, numerous examples of which have been given hereinbefore, constitute one class of compounds which, in the form of their monomers or partial polymers, are suitable for use in forming interpolymers or copolymers with the isocyanate-modified unsaturated alkyd resin. The acrylic (including α-substituted acrylic) compounds constitute another class that similarly may be used and include the esters, amides and nitriles, e. g., the methyl, ethyl and other alkyl acrylates and alkacrylates, acrylamide and N-mono- and di-(hydrocarbon) acrylamides, as well as acrylonitrile, methacrylonitrile, etc.

Other examples of copolymerizable monomers belonging to the aforementioned and other classes, and which may be used in practicing the present invention, are given in our copending applications Serial Nos. 694,156 and 694,157, filed August 30, 1946, and Serial Nos. 741,956 and 741,957, filed April 16, 1947, now Patents 2,468,713 and 2,468,716, respectively.

Allyl compounds, more particularly the allyl esters, are especially suitable for use with the isocyanate-modified, unsaturated alkyd resin in preparing copolymerizable compositions. Examples of such esters are allyl acrylate, allyl methacrylate, diallyl carbonate, diallyl malonate, diallyl maleate, diallyl fumarate, diallyl phthalate, diallyl succinate, diallyl glutonate, diallyl adipate, diallyl azelate, diallyl sebacate, diallyl citraconate, diallyl itaconate, diallyl chlorophthalate, triallyl tricarballylate, triallyl aconitate, triallyl citrate, triallyl phosphate, triallyl cyanurate, tetrallyl silane, hexaallyl disiloxane, etc. The esters containing a plurality of allyl groupings constitute a particularly useful class. Additional examples of allyl and other monomeric materials, including other polyesters of polybasic acids, that may be admixed with the unsaturated alkyd resin to form a polymerizable composition suitable for use in practicing the present invention are given in the aforementioned copending applications of one or both of us.

Mixtures of monomeric materials may be copolymerized with one or more unsaturated alkyd resins if desired.

The polymerization of the polymerizable composition may be effected with the aid of heat and/or light, preferably ultraviolet light, and with or without a polymerization catalyst. Preferably, polymerization of the composition is accelerated by incorporating a polymerization catalyst therein and heating the resulting mixture. The polymerization catalysts include the organic superoxides, alcoholic and acidic peroxides. Among the preferred catalyst are: the acidic peroxides, e. g., benzoyl peroxide, phthalic peroxide, succinic peroxide and benzoyl acetic peroxide, fatty oil peroxides, e. g., coconut oil acid peroxides, lauric peroxide, stearic peroxide and oleic peroxide; alcohol peroxides, e. g., tertiary-butyl hydroperoxide, and terpene oxides, e. g., ascaridole. Still other polymerization catalysts may be used in some cases, e. g., soluble cobalt salts (particularly the linoleate and naphthenate), p-toluene sulfonic acid, aluminum chloride, stannic chloride, boron trifluoride, etc.

The concentration of the catalyst employed is usually small, i. e., for the preferred catalysts from, by weight, about 1 part catalyst per thousand parts of the mixture of materials to be polymerized to about 2 parts catalyst per hundred parts of the said mixture. If an ihibitor be present, up to 5% or even more by weight of catalyst, based on the weight of the polymerizable composition, may be necessary according to the concentration of the inhibitor.

The temperature of polymerization may be varied considerably. A temperature is selected which will give a suitable reaction rate and yet not cause substantial volatilization of the material being polymerized. Obviously it will be necessary to use lower temperatures if large or very thick pieces are being cast because of the exothermic reaction and poor heat conductivity of the composition. Where suitable precautions are taken to prevent evaporation of the polymerizable material, higher temperatures than otherwise might be used may be employed. In most cases the temperature of polymerization or copolymerization will be within the range of 40° to 200° C., usually within the range of 60° to 130° C., depending upon the particular composition being polymerized, the particular catalyst, if any, used, the rapidity of polymerization or copolymerization wanted, and other influencing factors.

The proportions of the isocyanate-modified unsaturated alkyd resin and other monomeric material which is copolymerized therewith may be varied as desired or as conditions may require, e. g., from, by weight, 15 to 99% of the former to from 85 to 1% of the latter, but ordinarily the proportions thereof in the polymerizable mixture will be within the range of, by weight, from about 20 to 80% of the former to about 80 to 20% of the latter. Good results are obtained by using the isocyanate-modified unsaturated alkyd resin and the other comonomer, e. g., diallyl phthalate, styrene, ethyl acrylate, etc., in a weight percentage of from 25 to 75% of the former to from 75 to 25% of the latter, e. g., in about equal parts by weight.

As has been previously stated, the polymerizable isocyanate-modified, unsaturated alkyd resins of our invention are organic solvent-soluble, that is, they are soluble in some organic solvent but not necessarily in all organic solvents. Examples of such solvents, which may be of the reactive or non-reactive types, are benzene, xylene, toluene and other inert (non-reactive) solvents such as previously have been mentioned with reference to solvents that may be employed as media in which the reaction between the isocyanate and the unsaturated alkyl resin may be effected, and styrene, diallyl phthalate and other reactive solvents.

The present invention provides numerous new and useful compositions, more particularly resinous compositions, among which may be mentioned unsaturated alkyd resins which have been modified (chemically modified) with from about 3 to about 25%, more particularly from 5 to 20%, by weight thereof of allyl isocyanate or other primary isocyanate of the kind described hereinbefore, which modified alkyd resins are soluble in benzene or other organic solvent and are copolymerizable with styrene or other monomeric material, e. g., a compound containing a single or a plurality of $CH_2=C<$ groupings. The invention also provides compositions having improved water-repellency, better electrical properties, and other improved characteristics and which comprise the product of polymerization of a polymerizable mass comprising an isocyanate-modified, unsaturated alkyd resin of the kind just mentioned and styrene, ethyl acrylate, diallyl phthalate or other comonomer or mixture of comonomers. More specific examples of isocyanate-modified, unsaturated alkyd resins of our invention are the polymerizable, organic solvent-soluble, specifically benzene-soluble, resinous products of reaction of (1) an unsaturated alkyd resin obtained by reaction of a dihydric alcohol, an alpha,beta-unsaturated dicarboxylic acid and a saturated aliphatic dicarboxylic acid, e. g., such an alkyd resin having an acid number within the range of 10 to 80, and (2) from 3 to 25%, more particularly from 5 to 20%, based on the weight of the alkyd resin, of allyl isocyanate or other primary isocyanate of the kind described in the first paragraph of this specification and elsewhere herein. Thus, the starting unsaturated alkyd resin having an acid number of 10 to 80 may be one obtained by reaction of (1) a glycol (e. g., ethylene glycol, diethylene glycol, triethylene glycol, etc.), (2) fumaric acid, maleic acid (or anhydride) or other alpha,beta-unsaturated dicarboxylic acid (or anhydride) and (3) adipic acid, sebacic acid, succinic acid (or anhydride), phthalic acid (or anhydride) or other saturated aliphatic dicarboxylic acid (or anhydride) or aromatic dicarboxylic acid (or anhydride) in the ratio of 1 mol of the said glycol of (1) to 0.5 mol of each of the said acids of (2) and (3). Such isocyanate-modified, unsaturated alkyd resins then may be polymerized, more particularly under heat in the presence of a polymerization catalyst such, for instance, as an organic peroxide, e. g., benzoyl peroxide, either alone or while admixed with styrene, a diallyl ester of a dicarboxylic acid (e. g., diallyl maleate), or other monomeric material which is compatible and copolymerizable with the isocyanate-modified resin.

In order that those skilled in the art better may understand how the present invention may be carried into effect, the following examples are given by way of illustration and not by way of limitation. All parts are by weight.

Example 1

Allyl isocyanate (15 parts) is caused to react with eighty-five parts of an organic solvent-soluble unsaturated alkyd resin having an acid number of 43 and obtained by reaction of propylene glycol, fumaric acid and phthalic anhydride in the ratio of 6.6 mols propylene glycol, 4 mols fumaric acid and 2 mols of phthalic anhydride by heating a mixture of the said reactants under anhydrous reflux conditions at about 85°–95° C. for about 40 minutes on a steam bath. Thereafter the reaction mass is subjected to a reduced pressure to remove any unreacted allyl isocyanate.

The resulting polymerizable isocyanate-modified alkyd resin is more readily soluble and shows greater solubility in an organic solvent, specifically toluene, than does the untreated resin. Surprisingly, too, the isocyanate-treated resin is not so hard nor so brittle as the untreated resin.

Solutions of the treated and untreated alkyd resins are made as follows:

| | Parts |
|---|---|
| Alkyd resin | 5.0 |
| Toluene | 5.0 |
| Butyl acetate | 5.0 |
| Benzoyl peroxide | 0.1 |
| Cobalt naphthenate | 0.01 |

Glass plates are coated with samples of each of the solutions. The coated plates are allowed to air dry, after which they are heated for 1½ hours at 100° C. or for 1 hour at 150° C. in order to cure the resin films to a substantially insoluble, substantially infusible polymeric state. The cured films of the isocyanate-modified resin are characterized by their superior water-resistance as compared with cured films of the untreated resin, as shown by the following results of tests wherein each of the coated plates was immersed in water at room temperature (20°–25° C.) for 4 hours:

| Curing Conditions | Condition of Film After Water Immersion for 4 Hours | |
|---|---|---|
| | Untreated Alkyd Resin | Treated Alkyd Resin |
| 1½ hours at 100° C | Badly whitened, soft, weak | No effect. |
| 1 hour at 150° C | Scattered, slight spotting | Do. |

Example 2

Same as Example 1 with the exception that 20 parts of methallyl isocyanate and 80 parts of the unsaturated alkyd resin are employed. Similar results are obtained.

Example 3

Same as Example 1 with the exception that 10 parts of allyl isocyanate and 90 parts of an organic solvent-soluble unsaturated alkyd resin obtained by reaction of 98 parts of maleic anhydride and 106 parts of diethylene glycol and having an acid number of 20, which resin is prepared as described in Kropa Patent No. 2,409,633 with reference to the preparation of resin "D," is used instead of the unsaturated alkyd resin of Example 1. Similar results are obtained.

Example 4

Same as Example 1 with the exception that solutions of the treated and untreated alkyd resins are made as follows:

| | Parts |
|---|---|
| Alkyd resin | 8.0 |
| Diallyl phthalate | 2.0 |
| Ethyl acetate | 10.0 |
| Polymerization catalyst comprising a mixture of 50% benzoyl peroxide and 50% triphenyl phosphate | 0.2 |
| Cobalt naphthenate | 0.01 |

Glass plates are coated with samples of each of the solutions, after which they are allowed to air dry and then heated for 1 hour at 150° C. in order to cure the resin films to a substantially insoluble, substantially infusible state and to form a copolymer of the diallyl phthalate with the alkyd resin. After air drying and before heating, the film containing the isocyanate-modified alkyd resin is less tacky than the one containing the untreated resin.

The plates with the baked films thereon are partly immersed for 6 days in an aqueous 3% sodium carbonate solution. At the end of this period both films are still hard but the film of the untreated resin copolymer shows appreciable whitening (evidence of having been attacked) whereas the film of the copolymer of diallyl phthalate and isocyanate-modified unsaturated alkyd resin is unaffected.

Example 5

Same as Example 4 with the exception that 7 parts of alkyd resin and 3 parts of diallyl maleate are employed. Similar results are obtained.

Example 6

A

Twenty-seven parts of an organic solvent-soluble unsaturated alkyd resin having an acid number of 52 and obtained by reaction of ethylene glycol, fumaric acid and sebacic acid in the ratio of 1 mol of the said glycol to 0.5 mol each of the said acids is mixed with one molar equivalent (2.075 parts) of allyl isocyanate and 50 parts of an inert organic solvent, specifically benzene. The resulting solution is then heated under anhydrous reflux conditions on a steam bath for 45 minutes.

The benzene solution of the isocyanate-modified unsaturated alkyd resin is transferred to a shallow open container and the benzene evaporated off by heating first on a steam bath and then in a 100° C. oven. No odor of allyl isocyanate can be detected when the resin solution is transferred from the reaction vessel to the open container.

B

Same as in part A of this example with the exception that 4.15 parts (two molar equivalents) of allyl isocyanate is used and heating under anhydrous reflux conditions is continued for 1½ hours. A slight odor of allyl isocyanate is noted when the resin solution is transferred to the open container.

C

Solutions of each of the isocyanate-modified alkyd resins of A and B, as well as the unmodified resin, are prepared by dissolving each resin in a reactive solvent, specifically styrene, to which a polymerization catalyst also has been added, by warming on a steam bath. The proportions are as follows:

| | Parts |
|---|---|
| Alkyd resin | 15.0 |
| Styrene | 5.0 |
| Polymerization catalyst, specifically benzoyl peroxide | 0.1 |

The solutions are transferred to clean, glass vessels. The isocyanate-modified alkyd resins yield clearer solutions with the styrene than the unmodified alkyl resin, indicating that the isocyanate treatment has, surprisingly, improved the compatability of the resin with the styrene, In each case copolymerization of the resin with the styrene is effected by heating the solutions in the glass vessels according to the following schedule:

1 hour at 57° C.
15 minutes at 57°-100° C.
1½ hours at 100° C.

The resulting copolymers are hard and have a good color, the copolymer made with the untreated resin being slightly lighter in color than those made with the isocyanate-modified resins. Specimens of the castings are tested for their resistance to moisture by immersing in boiling water for 1 hour, wiping dry and noting the increase in weight. The results are as follows:

| | Per cent wt. increase |
|---|---|
| Copolymer made with untreated alkyd resin | 0.40 |
| Copolymer made with isocyanate-modified alkyd resin of A | 0.29 |
| Copolymer made with isocyanate-modified alkyd resin of B | 0.24 |

The foregoing results show the substantial improvement in moisture resistance which is obtained by using an allyl isocyanate-modified, unsaturated alkyd resin in making a copolymer with another monomer, specifically styrene.

*Example 7*

Same as Example 6 with the exception that 5 parts of diallyl phthalate are used in place of 5 parts of styrene. Similar results are obtained.

*Example 8*

Same as Example 6 with the exception that 5 parts of vinyl benzoate are used in place of 5 parts of styrene. Similar results are obtained.

*Example 9*

Same as Example 6 with the exception that 18 parts of alkyd resin and 2 parts of methyl methacrylate are used in place of 15 parts of the alkyd and 5 parts of styrene. Similar results are obtained.

*Example 10*

Same as Example 9 with the exception that equal parts of alkyd resin and styrene are employed. Similar results are obtained.

*Example 11*

Seventy-five parts of an organic solvent-soluble unsaturated alkyd resin having an acid number of 21 and obtained by reaction of diethylene glycol, sebacic acid and fumaric acid, in the ratio of 6.3 mols diethylene glycol, 3.5 mols sebacic acid and 2.5 mols fumaric acid and 25 parts of allyl isocyanate are heated together on a steam bath under anhydrous reflux conditions for about 1 hour, after which unreacted allyl isocyanate is distilled off under reduced pressure. The resulting polymerizable, isocyanate-modified, unsaturated alkyd resin is clear whereas the untreated resin is translucent apparently due to its semi-crystalline nature. Furthermore, the treated alkyd resin is more fluid than the untreated resin.

Copolymers are prepared from the treated and untreated resins as follows:

| | Parts |
|---|---|
| Alkyd resin | 16.0 |
| Styrene | 8.0 |
| Lauroyl peroxide | 0.24 | are heated together for 2 hours at 70° C. and 1 hour at 105° C. to yield solid copolymers. Sections of castings prepared from each copolymer are compared for water-resistant characteristics by weighing each casting before and after immersion in boiling water for 2 hours. The copolymer made from the untreated resin shows an increase in weight of 0.95% whereas one made from the isocyanate-modified alkyd resin shows an increase in weight of only 0.56%.

*Example 12*

Same as Example 11 with the exception that 8 parts of diallyl phthalate are used in place of 8 parts of styrene. Similar results are obtained.

*Example 13*

Same as Example 11 with the exception that 8 parts of isopropenyl toluene are used in place of 8 parts of styrene. Similar results are obtained.

It will be understood, of course, by those skilled in the art that our invention is not limited to the specific ingredients or to the proportions thereof employed in the above illustrative examples. Thus, instead of the particular isocyanate-modified unsaturated alkyd resins specified in the examples, we may use any other such modified resin of the kind mentioned in the first paragraph of this specification either alone or admixed with other comonomers, numerous examples of which previously have been given. The proportions may be varied as desired or as conditions may require, for instance, from 10 or 15 up to 90 or 95 or even as much as 99% of the isocyanate-modified unsaturated alkyd and the comonomer constituting the remainder. Catalysts other than those mentioned in the examples may be used, numerous examples of which have been mentioned hereinbefore.

The polymerizable compositions of this invention comprising an isocyanate-modified unsaturated alkyd resin of the kind hereinbefore described as the sole polymerizable component or admixed with another monomer or partial copolymer which is compatible and copolymerizable therewith have a wide variety of applications. For instance, with or without a filler, they may be used in the production of molding compositions and molded articles; as the binder in the production of laminated articles; as coating compositions (or as components thereof) for use in finishes for wood, metals, plastics, etc., or in the treatment of fibrous materials, e. g., paper, cloth, leather, etc.; as impregnants for fibrous materials, as electrically insulating compositions, etc. They also may be employed in general adhesive applications and in the production of castings.

Fillers, dyes, pigments, opacifiers, lubricants, polymerization catalysts, etc., may be incorporated into these new compositions to yield molding and other compositions. Such modifiers may be incorporated into the polymerizable or partly polymerized composition, and the modified composition then may be completely or substantially completely polymerized to a hard, substantially infusible state during molding. Examples of fillers that may be employed are alpha-cellulose pulp, asbestos fibers, cotton flock, chopped cloth cuttings, glass fibers, wood flour, mica dust, sand, clay, diatomaceous earth, etc.

Natural or other synthetic resins and other modifiers may be incorporated into the isocyanate-modified unsaturated alkyd resin or mixture thereof with a comonomer in order to modify the same and to obtain products especially suitable for a particular service application. Examples of such modifying agents are shellac, ester gums, cellulose esters and ethers, phenol-aldehyde resins, urea-aldehyde resins, aminotriazine-aldehyde resins (e. g., melamine-formaldehyde resins), hydrocarbon-substituted polysiloxane resins, e. g., methyl polysiloxane resins, methyl phenyl polysiloxane resins, phenyl polysiloxane resins, conventional alkyd resins of the non-polymerizable type, etc.

We claim:

1. A polymerizable composition comprising a polymerizable product of reaction of ingredients comprising (1) an organic solvent-soluble unsaturated alkyd resin containing a plurality of polymerizably reactive alpha,beta-enal groups, and (2) from 3 to 25%, by weight of the alkyd resin of (1), of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrogen radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value of the group consisting of 0 and 1, the methylene radical attached to the isocyanate grouping being attached directly, when $n$ is 1, to any carbon atom of the divalent radical represented by A.

2. A product comprising the polymerized composition of claim 1.

3. An organic solvent-soluble resinous composition comprising the product of reaction of components comprising (1) an unsaturated alkyd resin obtained by reaction of ingredients comprising a polyhydric alcohol and an alpha,beta-unsaturated polycarboxylic acid, said alkyd resin having an acid number within the range of 10 to 80 and (2) from 3 to 25%, by weight of the alkyd resin of (1), of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals, and divalent aromatic-substituted saturated aliphatic hydrocarbon radicals, and $n$ represents a value of the group consisting of 0 and 1, the methylene radical attached to the isocyanate grouping being attached directly, when $n$ is 1, to any carbon atom of the divalent radical represented by A.

4. An unsaturated alkyd resin containing a plurality of polymerizably reactive alpha,beta-enal groups, said alkyd resin being coreacted with from 5 to 20% by weight thereof of allyl isocyanate, the resulting product resin being soluble in benzene and being copolymerizable with other monomeric materials.

5. A composition comprising the product of polymerization of a polymerizable mass comprising (1) a vinyl compound and (2) a different substance which is copolymerizable with the vinyl compound of (1) and which is a polymerizable product of reaction of ingredients comprising (a) an organic solvent-soluble unsaturated alkyd resin containing a plurality of polymerizably reactive alpha,beta-enal groups and which is obtained by reaction of ingredients comprising a polyhydric alcohol and an unsaturated polycarboxylic acid, and (b) from 3 to 25%, by weight of the alkyd resin of (a), of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value of the group consisting of 0 and 1, the methylene radical attached to the isocyanate grouping being attached directly, when $n$ is 1, to any carbon atom of the divalent radical represented by A.

6. A composition as in claim 5 wherein the vinyl compound of (1) is styrene.

7. A composition comprising (1) the product of polymerization of a polymerizable mass comprising styrene and (2) an unsaturated alkyd resin obtained by reaction of ingredients comprising a polyhydric alcohol and an alpha,beta-unsaturated polycarboxylic acid, said alkyd resin being coreacted with from 5 to 20% by weight thereof of allyl isocyanate, and said product of (2) being soluble in benzene and being copolymerizable with styrene.

8. A composition comprising the product of polymerization of a polymerizable mass comprising (1) styrene and (2) a polymerizable benzene-soluble, resinous product of reaction of (a) an unsaturated alkyd resin obtained by reaction of a dihydric alcohol, an alpha,beta-unsaturated dicarboxylic acid and a saturated aliphatic dicarboxylic acid, said alkyd resin having an acid number within the range of 10 to 80, and (b) from 5 to 20% of allyl isocyanate based on the weight of the alkyd resin of (a), the ingredients of (1) and (2) being copolymerizable.

9. A copolymer of (1) styrene and (2) a resinous material which is copolymerizable therewith and which is a product of reaction of (a) an unsaturated alkyd resin obtained by reaction of ethylene glycol, fumaric acid and sebacic acid in the ratio of 1 mol of the said glycol to 0.5 mol each of the said acids, said alkyd resin having an acid number of 10 to 80 and (b) from 5 to 20% of allyl isocyanate based on the weight of the alkyd resin of (a).

10. A composition comprising the product of polymerization of a polymerizable mass comprising (1) an acrylic compound containing a $CH_2=C<$ grouping and (2) a substance which is copolymerizable with the acrylic compound of (1) and which is a polymerizable product of reaction of ingredients comprising (a) an organic solvent-soluble unsaturated alkyd resin containing a plurality of polymerizably reactive alpha,beta-enal groups and which is obtained by reaction of ingredients comprising a polyhydric alcohol and an unsaturated polycarboxylic acid, and (b) from 3 to 25%, by weight of the alkyd resin of (a), of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value of the group consisting of 0 and 1, the methylene radical attached to the isocyanate grouping being attached directly, when n is 1, to any carbon atom of the divalent radical represented by A.

11. A composition comprising the product of polymerization of a polymerizable mass comprising (1) an ester containing a plurality of allyl groupings and (2) a substance which is copolymerizable with the ester of (1) and which is a polymerizable product of reaction of ingredients comprising (a) an organic solvent-soluble unsaturated alkyd resin containing a plurality of polymerizably reactive alpha,beta-enal groups and which is obtained by reaction of ingredients comprising a polyhydric alcohol and an unsaturated polycarboxylic acid, and (b) from 3 to 25%, by weight of the alkyd resin of (a), of a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value of the group consisting of 0 and 1, the methylene radical attached to the isocyanate grouping being attached directly, when n is 1, to any carbon atom of the divalent radical represented by A.

12. A composition as in claim 11 wherein the ester of (1) is a diallyl ester of a dicarboxylic acid.

13. The method of preparing a resinous composition which comprises effecting reaction, under anhydrous conditions and while dissolved in an organic solvent in which the reactants are inert, between ingredients comprising (1) an organic solvent-soluble unsaturated alkyd resin containing a plurality of polymerizably reactive alpha,beta-enal groups, and (2) from 3 to 25%, by weight of the alkyd resin of (1), of a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value of the group consisting of 0 and 1, the methylene radical attached to the isocyanate groupings being attached directly, when n is 1, to any carbon atom of the divalent radical represented by A, and removing the organic solvent from the resulting reaction mass.

14. A method as in claim 13 wherein the primary isocyanate of (2) is allyl isocyanate.

15. The method of preparing a new synthetic composition which comprises polymerizing a polymerizable composition containing a polymerizable product of reaction of ingredients comprising (1) an organic solvent-soluble unsaturated alkyd resin containing a plurality of polymerizably reactive alpha,beta-enal groups and which is obtained by reaction of ingredients comprising a polyhydric alcohol and an unsaturated polycarboxylic acid, and (2) from 3 to 25%, by weight of the alkyd resin of (1), of a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value of the group consisting of 0 and 1, the methylene radical attached to the isocyanate grouping being attached directly, when n is 1, to any carbon atom of the divalent radical represented by A.

16. The method of preparing a new synthetic composition which comprises heating under reflux a solution containing (1) an organic solvent-soluble unsaturated alkyd resin obtained by reaction of ingredients comprising a polyhydric alcohol and an alpha-beta-unsaturated polycarboxylic acid, and (2) from 3 to 25%, by weight of the alkyd resin of (1), of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and n represents a value of the group consisting of 0 and 1, the methylene radical attached to the isocyanate grouping being attached directly, when n is 1, to any carbon atom of the divalent radical represented by A and the reactants of (1) and (2) being dissolved in an organic solvent in which they are inert, removing the solvent from the resulting reaction mass, and copolymerizing the solvent-free polymerizable resinous composition thereby obtained with a different monomeric material which is copolymerizable therewith and which contains $CH_2=C<$ grouping.

17. A polymerizable composition as in claim 1 wherein the primary isocyanate of (2) is allyl isocyanate.

ARTHUR S. NYQUIST.
EDWARD L. KROPA.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,327,985 | Alderman et al. | Aug. 21, 1943 |
| 2,333,914 | Berchet | Nov. 9, 1943 |

OTHER REFERENCES

Ser. No. 397,741, Schlack (A. P. C.), published April 20, 1943.

Certificate of Correction

Patent No. 2,503,209 April 4, 1950

ARTHUR S. NYQUIST ET AL.

It is hereby certified that errors appear in the printed specification of the above numbered patent requiring correction as follows:

Column 3, line 75, column 12, line 17, and column 15, line 11, for "alkyl" read *alkyd*; column 7, line 71, for the word "terms" read *term*; line 72, before '"dicarboxylic acid"' insert *and*; column 8, line 9, after "(30.3 parts)" insert a comma; column 11, line 25, for "catalyst" read *catalysts*; line 42, for "ihibitor" read *inhibitor*; column 17, line 33, for "hydrogen" read *hydrocarbon*; line 73, strike out "resin"; column 18, line 33, after "comprising" strike out "(1)" and insert the same in line 35, same column, after the syllable "prising";

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*